United States Patent
Ma et al.

(10) Patent No.: US 12,287,748 B2
(45) Date of Patent: Apr. 29, 2025

(54) HIGH-SPEED LOW-LATENCY INTERCONNECT INTERFACE (HLII) FOR SILICON INTERPOSER INTERCONNECTION

(71) Applicant: WUXI ESIONTECH CO., LTD., Wuxi (CN)

(72) Inventors: Xiaojie Ma, Wuxi (CN); Yanfeng Xu, Wuxi (CN); Yuting Xu, Wuxi (CN); Boyin Chen, Wuxi (CN); Yanfei Zhang, Wuxi (CN); Yueer Shan, Wuxi (CN)

(73) Assignee: WUXI ESIONTECH CO., LTD., Wuxi (CN)

( * ) Notice: Subject to any disclaimer, the term of this patent is extended or adjusted under 35 U.S.C. 154(b) by 40 days.

(21) Appl. No.: 18/446,501

(22) Filed: Aug. 9, 2023

(65) Prior Publication Data

US 2023/0385222 A1    Nov. 30, 2023

Related U.S. Application Data

(63) Continuation-in-part of application No. PCT/CN2023/082961, filed on Mar. 22, 2023.

(30) Foreign Application Priority Data

Dec. 30, 2022   (CN) .......................... 202211730093.4

(51) Int. Cl.
  *G06F 13/40* (2006.01)
  *G06F 11/27* (2006.01)

(52) U.S. Cl.
  CPC .......... *G06F 13/4068* (2013.01); *G06F 11/27* (2013.01)

(58) Field of Classification Search
  CPC ...... G06F 13/4068; G06F 11/27; G06F 30/30; Y02D 10/00
  See application file for complete search history.

(56) References Cited

U.S. PATENT DOCUMENTS

| | | | | |
|---|---|---|---|---|
| 2011/0075496 A1* | 3/2011 | Mueller | ............... | G11C 29/022 365/194 |
| 2013/0044796 A1 | 2/2013 | Haldar et al. | | |

(Continued)

FOREIGN PATENT DOCUMENTS

| | | |
|---|---|---|
| CN | 106502932 A | 3/2017 |
| CN | 109661658 A | 4/2019 |

(Continued)

*Primary Examiner* — Phong H Dang
(74) *Attorney, Agent, or Firm* — Bayramoglu Law Offices LLC

(57) ABSTRACT

A high-speed low-latency interconnect interface (HLII) for silicon interposer interconnection is provided. The HLII is configured to perform large-scale input/output (I/O) interconnection on a silicon interposer, and includes a physical link (PL) and an LL (LL). The LL receives a data signal, a configuration signal, and a control signal of logical resource inside a chiplet, and can complete data conversion, parity check, training, channel repair, instruction stream generation, and other functions for the PL. The PL receives and transmits a data signal converted by the LL. The PL includes a high-speed I/O port, a first input first output (FIFO), and related control logic. The high-speed I/O port of the PL is compatible with both a double date rate (DDR) transmission mode and a single data rate (SDR) transmission mode.

13 Claims, 11 Drawing Sheets

(56) References Cited

U.S. PATENT DOCUMENTS

| | | | |
|---|---|---|---|
| 2015/0242535 A1* | 8/2015 | Zhang | G06F 16/90339 710/313 |
| 2015/0261631 A1* | 9/2015 | Kurihara | G06F 11/073 714/6.11 |
| 2019/0020466 A1* | 1/2019 | Raymond | H04B 10/40 |
| 2022/0094639 A1* | 3/2022 | Mutschler | H04L 43/0888 |
| 2022/0121610 A1* | 4/2022 | Walker | G06F 13/423 |
| 2023/0042222 A1* | 2/2023 | Brewer | H04L 69/18 |
| 2024/0014161 A1* | 1/2024 | Arbel | H01L 23/5384 |

FOREIGN PATENT DOCUMENTS

| | | |
|---|---|---|
| CN | 111737192 A | 10/2020 |
| CN | 113553277 A | 10/2021 |
| CN | 113971143 A | 1/2022 |

\* cited by examiner

HIGH-SPEED LOW-LATENCY INTERCONNECT INTERFACE (HLII) FOR SILICON INTERPOSER INTERCONNECTION

CROSS REFERENCE TO THE RELATED APPLICATIONS

This application is a continuation-in-part application of International Application No. PCT/CN2023/082961, filed on Mar. 22, 2023, which is based upon and claims priority to Chinese Patent Application No. 202211730093.4, filed on Dec. 30, 2022, the entire contents of which are incorporated herein by reference.

TECHNICAL FIELD

The present disclosure relates to the technical field of high-speed physical interface design, and in particular, to a high-speed low-latency interconnect interface (HLII) for silicon interposer interconnection.

BACKGROUND

After Dennard's geometric scaling fails, it is proposed that a semiconductor technology roadmap focuses on expanding Moore's law based on diversified packaging while continuing Moore's law. Upgrading monolithic integration to a system on chip (SoC) is a milestone development in the semiconductor industry. However, as deep subnanometer technology is adopted, not only does the difficulty increase, but also design cost is high, making it difficult to get a return from an investment in a limited market capacity.

What's more, with an explosive growth of applications of high computing power such as big data, a traditional homogeneous processor has been difficult to meet a computing requirement, and a special accelerator is needed for heterogeneous computing (HC). Different chiplets need to be heterogeneously integrated to complete the HC. In addition, high bandwidth memory (HBM) suitable for highly-intensive data applications also needs to be heterogeneously integrated. Therefore, there is urgency to design an HLII for silicon interposer interconnection.

However, the silicon interposer interconnection needs to complete large-scale high-speed input/output (I/O) interconnection between heterogeneous chiplets, and has different interface designs from those for traditional interconnection between printed circuit board (PCB) layers or system in a package (SIP) integration. Therefore, the design of a traditional high-speed interface is no longer suitable for an HLII architecture for the silicon interposer interconnection, and data transmission efficiency and power consumption of the HLII architecture also face challenges.

SUMMARY

Technical Problems

The silicon interposer interconnection needs to complete large-scale high-speed input/output (I/O) interconnection between heterogeneous chiplets, and has different interface designs from those for traditional interconnection between printed circuit board (PCB) layers or system in a package (SIP) integration. Therefore, a design of a traditional high-speed interface is no longer suitable for an HLII architecture for the silicon interposer interconnection, and data transmission efficiency and power consumption of the HLII architecture also face challenges.

Technical Solutions

Based on this, it is necessary to provide an HLII for silicon interposer interconnection to resolve the aforementioned technical problems.

According to a first aspect, the present disclosure provides an HLII for silicon interposer interconnection. The HLII includes a physical layer (PL) and a link layer (LL) between logical resource inside a chiplet and the PL, where the LL is configured to receive a signal of the logical resource inside the chiplet, transmit the signal of the logical resource inside the chiplet to the PL, and the LL is further configured to control the PL based on the signal of the logical resource inside the chiplet, where the signal of the logical resource inside the chiplet includes a data signal, and the transmitting, by the LL, the signal of the logical resource inside the chiplet to the PL includes performing data conversion on the data signal and sending a converted data signal to the PL; and the PL is configured to receive the signal transmitted through the LL, and transmit the signal to a PL of another HLII through a silicon interposer; and the PL is further configured to receive a signal transmitted by the PL of the another HLII, and transmit the signal transmitted by the PL of the another HLII to the LL of the HLII, such that the LL receives the signal and then transmits the signal to the logical resource inside the chiplet.

In an embodiment, the signal of the logical resource inside the chiplet further includes a configuration signal and a control signal, and the controlling the PL includes performing data conversion, parity check, training, channel repair, and instruction stream generation for the PL.

In an embodiment, the PL includes at least one transmission channel, and the LL includes at least one logical control channel, where a quantity of transmission channels is the same as a quantity of logical control channels;

the transmission channel is configured to transmit the data signal, and modes of transmitting, by the transmission channel, the data signal include a double date rate (DDR) transmission mode and a single data rate (SDR) transmission mode; and each logical control channel is configured to control and schedule a data flow transmitted by the corresponding one transmission channel.

In an embodiment, each of the transmission channels includes a plurality of transmission subchannels, and each of the transmission subchannels is responsible for transmitting at least a 32-bit data signal; and each of the logical control channels includes a plurality of logical control subchannels, the logical control subchannels are in one-to-one correspondence with the transmission subchannels, and each logical control subchannel is configured to control and schedule a data flow transmitted by the corresponding one transmission subchannel.

In an embodiment, the transmission subchannel includes a plurality of data word (DWORD) bit slices, a transmit (Tx) clock generation module, a receive (Rx) clock generation module, a DWORD first input first output (FIFO) controller, a latency line tester, and an Rx clock buffer;

each of the DWORD bit slices includes one Tx data FIFO, one Rx data FIFO, one Tx I/O, and one Rx I/O;

the Tx clock generation module is configured to generate a high-speed clock;

the Rx clock generation module is configured to generate a high-speed clock and a read clock for capturing read data;

the DWORD FIFO controller is configured to control the Tx data FIFO and the Rx data FIFO in the DWORD bit slice;

the latency line tester is configured to test a ring oscillator of a latency line, and the latency line is configured to fine tune a latency of a Tx clock to concentrate the clock on a data eye; and the Rx clock buffer is configured to add a clock driver.

In an embodiment, the logical control subchannel includes a control module, a latency line controller, a DWORD loopback built-in self-test (BIST), a data generation module, and a data check module;

the control module is configured to control a data path and carry the data signal;

the latency line controller is configured to perform control, calibration, and virtualization technology (VT) compensation on a DWORD latency line;

the DWORD loopback BIST is used to generate BIST logic in loopback testing and latency line testing; and the data generation module and the data check module are configured to generate training and testing data.

In an embodiment, the PL further includes a PL master and an interface testing module;

the PL master is configured to provide a global clock, a reset signal, and a reference voltage for the PL; and the interface testing module is configured to conduct a functional test on the HLII.

In an embodiment, the LL further includes an LL master, and the LL master includes a configuration module, master control and status registers (CSRs), an initialization engine, a training controller, a resetting and testing controller, a P1500 controller, an instruction stream generator, and an instruction unit;

the configuration module is configured to interact with transactions of an advanced peripheral bus (APB) interface, a test data register (TDR) interface, and a joint test action group (JTAG) interface for reading and writing CSRs;

the master CSRs include all CSRs capable of being shared by the entire HLII;

the initialization engine is configured to implement an initialization process in terms of hardware and cooperate with CSRs to initialize the HLII;

the training controller is configured to automatically train a read latency, a read data eye, a write data eye, and a reference voltage;

the resetting and testing controller is configured to generate the reset signal, control and calibrate impedance of an I/O driver, provide a global reference voltage for an I/O receiver, provide a testing output I/O port configured to monitor an internal testing signal of the HLII, and provide an I/O port of an interface testing module;

the P1500 controller is configured to generate a P1500 instruction for testing;

the instruction stream generator is an engine for executing an internal instruction of the HLII and the P1500 instruction; and the instruction unit is configured to decode and distribute an internal instruction of the HLII.

According to a second aspect, the present disclosure further provides a high-speed low-latency interconnection topology for silicon interposer interconnection, including a plurality of chiplets stacked on a silicon interposer and at least one interconnection interface corresponding to each of the chiplets, where the interconnection interface is the HLII according to the first aspect of the present disclosure.

In an embodiment, each of the interconnection interfaces includes at least one transmission channel, and transmission channels of the interconnection interfaces are symmetrical and identical to support interconnection between the interconnection interfaces.

Advantages

The HLII for silicon interposer interconnection includes a PL and an LL. The LL is located between the PL and logical resource inside a chiplet. The LL is configured to receive a signal of the logical resource inside the chiplet, and can complete a control function for the PL. The PL receives and transmits a signal transmitted through the LL, such as a data signal converted by the LL, for example, transmits the data signal to a PL of another HLII through a silicon interposer; and the PL is further configured to receive a signal transmitted by the PL of the another HLII, transmits the signal transmitted by the PL of the another HLII to the LL of the HLII, such that the LL receives the signal and then transmits the signal to the logical resource inside the chiplet, to transmit a data flow between the Hills for silicon interposer interconnection. This can provide the chiplet with protocol-free high-speed data transmission on a silicon interposer, achieving efficient data transmission, a high-performance power consumption ratio, and other requirements.

In some embodiments, the HLII for silicon interposer interconnection can support a plurality of transmission channels. Each of the transmission channels supports parallel data transmission, and is compatible with a DDR transmission mode and an SDR transmission mode. Each of the transmission channels includes a plurality of transmission subchannels, and each of the transmission subchannels can transmit at least 32-bit data. The working mode of one, two, four, eight, or more transmission channels may be configured for the HLII in the present disclosure to meet design requirements of different cases. All channels of the HLII are symmetrical and identical, and a PL of the HLII with multiple transmission channels can support interconnection with other multiple chiplets by simultaneously using multiple Hills.

DETAILED DESCRIPTION OF THE EMBODIMENTS

To make the objectives, technical solutions, and advantages of the present disclosure clearer, the present disclosure is further described in detail below with reference to the accompanying drawings and embodiments. It should be understood that the specific embodiments described herein are merely used to explain the present disclosure, rather than to limit the present disclosure.

Figure 1:
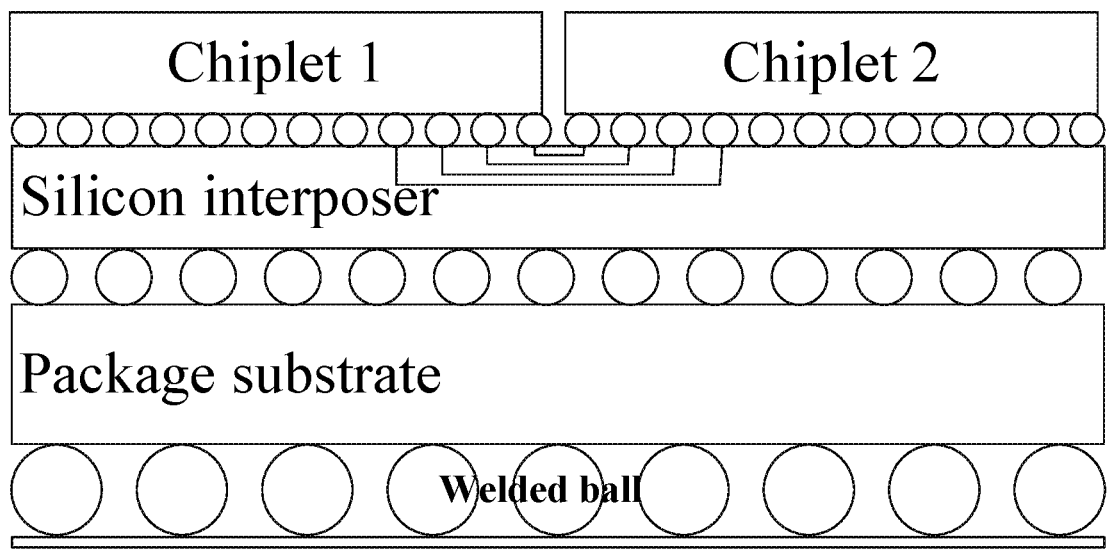
FIG. 1 schematically shows interconnection between different chiplets (central processing unit (CPU)/graphics processing unit (GPU)/SoC/field-programmable gate array (FPGA)/storage particle) on a silicon interposer according to an embodiment.

An HLII for silicon interposer interconnection provided in the embodiments of the present disclosure can be applied to an application environment shown in FIG. 1. Chiplet 1 and chiplet 2 are stacked on a silicon interposer, and each chiplet may correspond to one or more HLIIs. The HLII provides the chiplet with protocol-free high-speed data transmission on the silicon interposer. The chiplet may be a CPU, a GPU, a SoC, an FPGA, a storage particle, or the like. The HLII is designed to provide logical support for all chiplets compatible with the HLII.

Figure 2:
FIG. 2 is a block diagram of a top-level architecture of an HLII according to an embodiment.

In an embodiment, as shown in FIG. 2, an HLII for silicon interposer interconnection is provided. An example in which the HLII is applied to interconnection between different chiplets in FIG. 1 on a silicon interposer is used for description. The HLII includes a PL and an LL. The LL is located between logical resource inside a chiplet and the PL.

The LL is configured to receive a signal of the logical resource inside the chiplet, transmit the data signal of the logical resource inside the chiplet to the PL, and the LL is further configured to control the PL based on the signal of the logical resource inside the chiplet. The signal of the logical resource inside the chiplet includes a data signal, and the transmitting, by the LL, the signal of the logical resource inside the chiplet to the PL includes performing data conversion on the data signal and sending a converted data signal to the PL.

The PL is configured to receive the signal transmitted through the LL, and transmit the received signal transmitted through the LL to a PL of another HLII through a silicon interposer; and the PL is further configured to receive a signal transmitted by the PL of the another HLII, and transmit the received signal transmitted by the PL of the another HLII to the LL of the HLII, such that the LL receives the signal and then transmits the signal to the logical resource inside the chiplet.

Specifically, data transmission of the HLII is mainly implemented by using the LL and the PL. The LL is located between the PL of the HLII and the logical resource inside the chiplet. Signal transmission between the logical resource inside the chiplet and the LL, signal transmission between the LL and the PL, and signal transmission between the PL and the PL of the another HLII through the silicon interposer are all bidirectional.

For example, the logical resource inside the chiplet 1 sends a data signal to the LL of the corresponding HLII. After receiving the data signal, the LL performs data conversion and sends a converted data signal to the PL. The PL receives the data signal converted by the LL and transmits the data signal to the PL of the another HLII through the silicon interposer. The PL of the another HLII transmits the data signal to the LL of the corresponding HLII. Finally, the LL transmits the data signal to the logical resource inside the corresponding chiplet 2 to complete data transmission from the chiplet 1 to the chiplet 2.

The HLII for silicon interposer interconnection includes a PL and an LL. The LL is located between the PL and logical resource inside a chiplet. The LL is configured to receive a signal of the logical resource inside the chiplet, and can complete a control function for the PL. The PL receives and transmits a signal transmitted through the LL, such as a data signal converted by the LL, for example, the PL transmits the data signal to a PL of another HLII through a silicon interposer; and the PL receives a signal transmitted by the PL of the another HLII, transmits the signal to the LL, such that the LL receives the signal and then transmits the signal to the logical resource inside the chiplet, to transmit a data flow between the Hills for silicon interposer interconnection. This can provide the chiplet with protocol-free high-speed data transmission on a silicon interposer, achieving efficient data transmission, a high-performance power consumption ratio, and other requirements.

Figure 3:
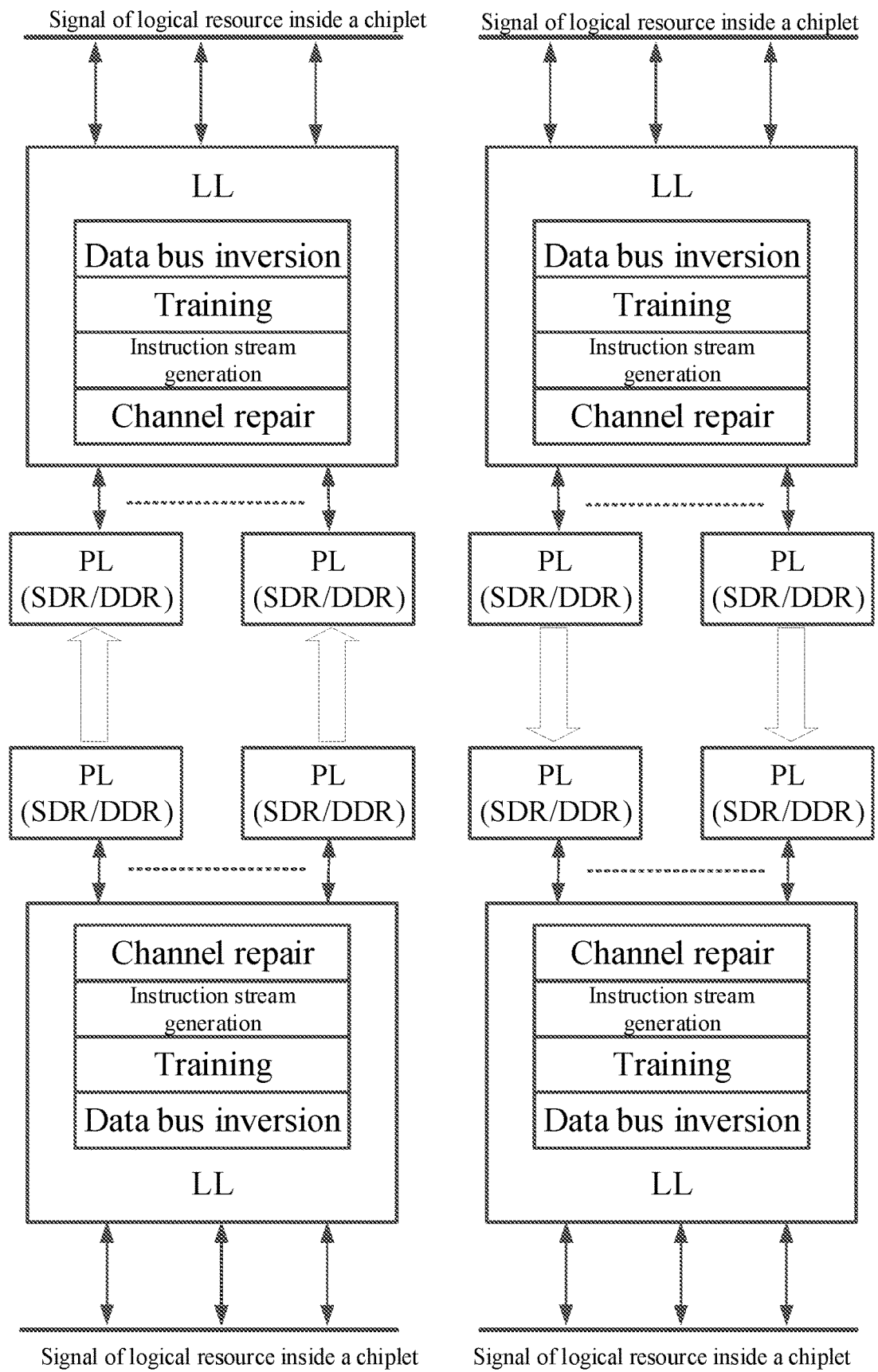
FIG. 3 schematically shows a hierarchical relationship of an HLII according to an embodiment.

In an embodiment, as shown in FIG. 3, as described above, the data transmission of the HLII is mainly implemented by using the LL and the PL. The LL is located between the PL of the HLII and the logical resource inside the chiplet to receive the signal of the logical resource inside the chiplet, including the data signal, a configuration signal, and a control signal, and complete data conversion, parity check, training, channel repair, instruction stream generation, and other functions for the PL. The LL mainly provides a control function to facilitate the logical resource inside the chiplet in performing initialization, latency line calibration, and VT compensation, and other operations for the PL of the HLII, and can cooperate with an internal register of the chiplet to program the configuration and control of a register. The LL has a BIST feature to conduct a functional test on the PL. The LL and the PL are connected through a dedicated data interface. In addition, the LL further includes CSRs that can be accessed through a configuration port. In addition to being accessed through an APB interface, the CSRs also have a separate optional TDR interface to improve the usability on a function of testing and accessing. The PL receives and transmits the data signal converted by the LL. The PL mainly includes a high-speed I/O port, a FIFO, and related control logic. The high-speed I/O port of the PL is compatible with both a DDR transmission mode and an SDR transmission mode.

Figure 4:
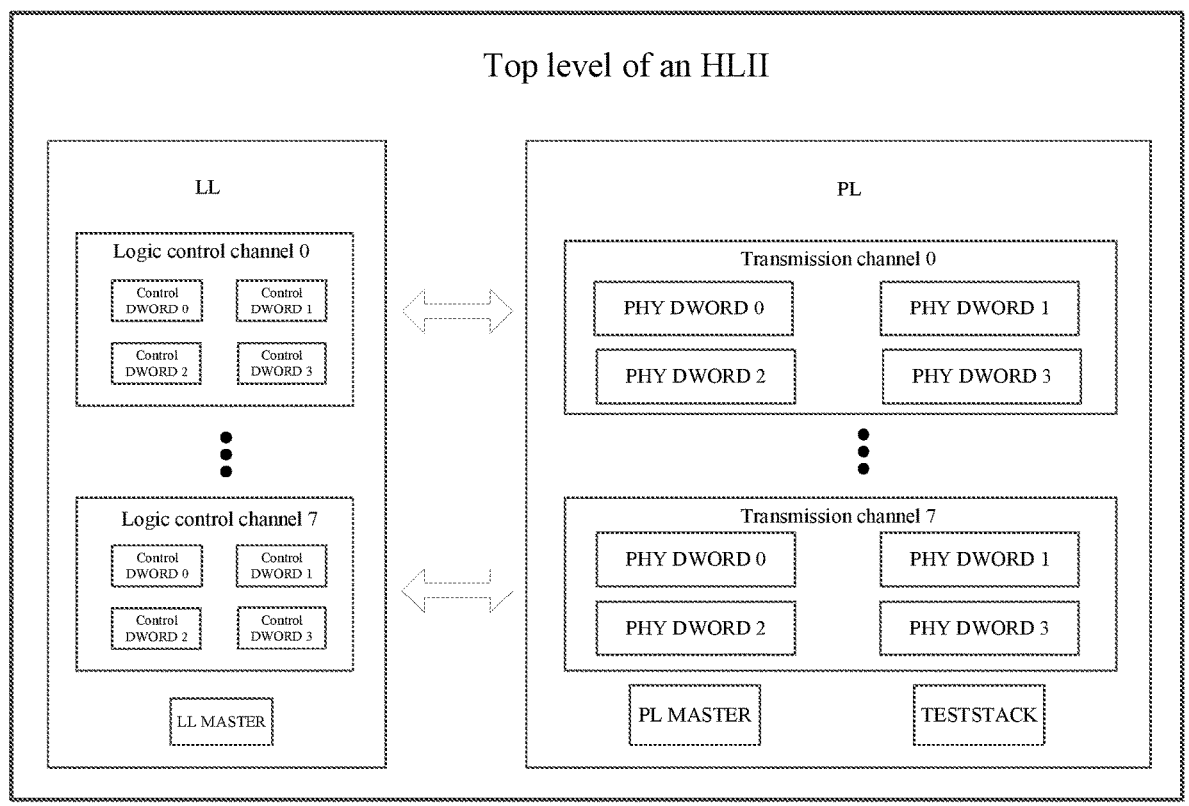
FIG. 4 is a block diagram of a top-level design structure of an HLII according to an embodiment.

The HLII provides the chiplet with protocol-free high-speed data transmission on the silicon interposer. As shown in FIG. 4, FIG. 4 shows a top-level design structure of the HLII. As shown in the FIG. 4, the HLII includes the PL and the LL. The PL includes at least one transmission channel, a PL master, and an interface testing module (TESTSTACK). The LL includes at least one logical control channel and an LL master.

A quantity of transmission channels is the same as a quantity of logical control channels. The transmission channel is configured to transmit the data signal, and modes of transmitting the data signal include the DDR transmission mode and the SDR transmission mode. The logical control channel is configured to control and schedule a data flow of the transmission channel, and complete timing sequence calibration, impedance calibration, BIST process control, channel repair, and other functions.

The PL master provides a global clock, a reset signal, and a reference voltage (VREF) of a host for the entire physical layer. The interface testing module is configured to conduct the functional test on the HLII.

Figure 5:
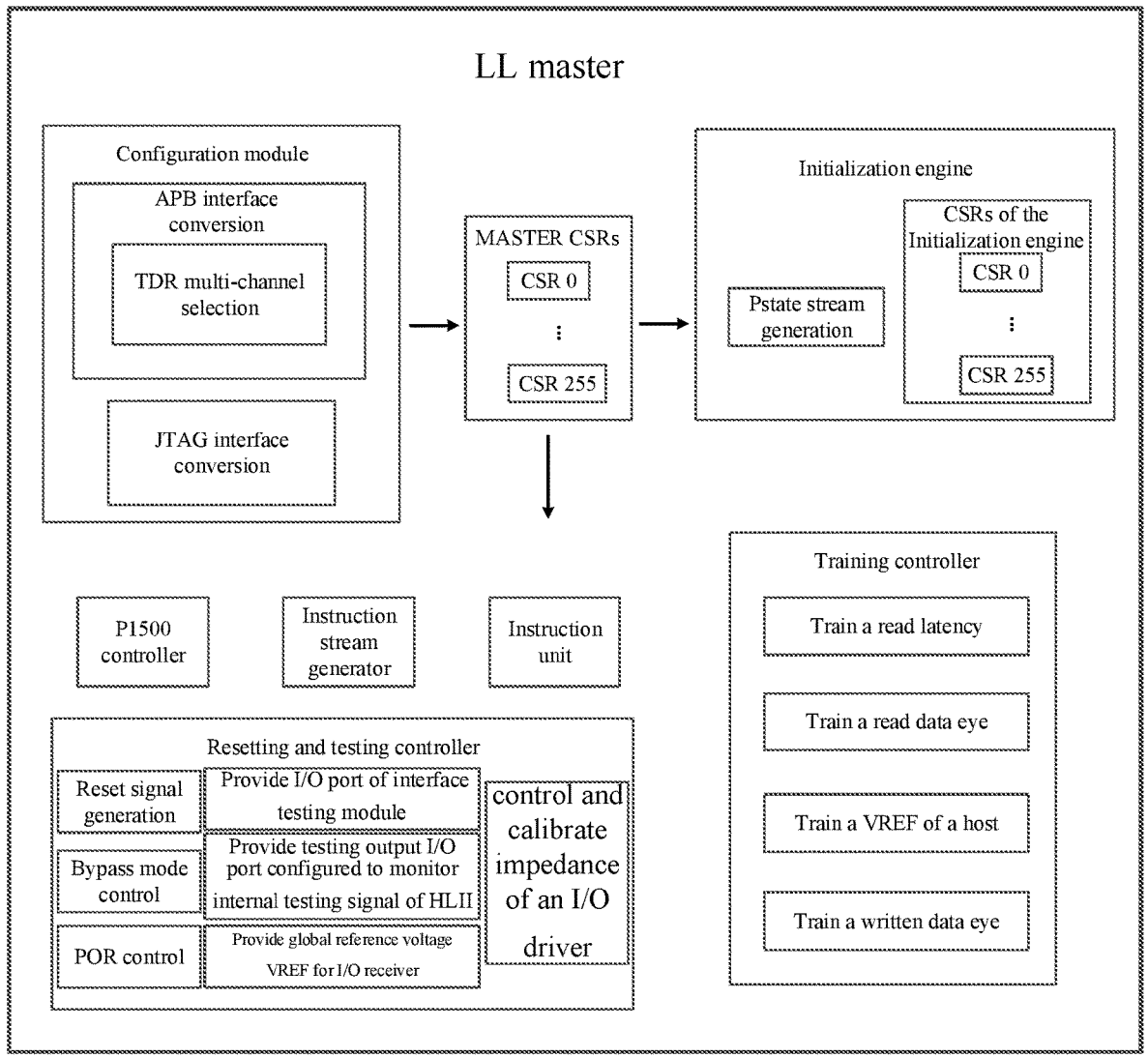
FIG. 5 is a block diagram of a top-level structure of an LL master according to an embodiment.

The LL master implements control logic and can be shared by various logical control channels. As shown in FIG. 5, the LL master includes a configuration module, master CSRs, an initialization engine, a training controller, a resetting and testing controller, a P1500 controller, an instruction stream generator, and an instruction unit. The master CSRs include all CSRs shared by the entire HLII, and these CSRs are not included in the CSRs already implemented in each logical control channel. The configuration module is configured to interact with transactions of an APB interface, a TDR interface, and a JTAG interface for reading and writing the CSRs. As the APB interface, the JTAG interface, and the master CSRs operate in different clock domains, the configuration module not only converts configuration information of the APB interface and the JTAG interface into the data of internal CSRs, but also needs to process the data across clock domains. The initialization engine is configured to implement an initialization process in terms of hardware and cooperate with the CSRs to initialize the HLII. In addition, the initialization engine can also perform frequency switching to allow the HLII to operate at different power consumption states. The training controller can automatically train a read latency, a read data eye, a write data eye, and the VREF of the host. The instruction stream generator is an engine for executing an internal instruction of the HLII and the P1500 instruction. The instruction unit can centrally decode and distribute an internal instruction of the HLII. The resetting and testing controller can realize different control, including the operation of generating the reset signal, controlling and calibrating the impedance of an I/O driver, providing the global reference voltage VREF for an I/O receiver, providing a testing output I/O port configured to monitor an internal testing signal of the HLII, and providing an I/O port of the interface testing module.

In an embodiment, each of the transmission channels includes a plurality of transmission subchannels (PHY DWORDs), and each of the transmission subchannels is responsible for transmitting at least a 32-bit data signal. Each of the logical control channels includes a plurality of logical control subchannels (control DWORDs), the logical control subchannels are in one-to-one correspondence with the transmission subchannels, and the logical control subchannel is configured to control and schedule a data flow transmitted by the corresponding transmission subchannel. For example, logical control channel 0 corresponds to transmission channel 0, and control DWORD 0 in the logical control channel 0 corresponds to PHY DWORD 0 in the transmission channel 0. The control DWORD 0 controls and schedules a data flow transmitted by the PHY DWORD 0.

In an embodiment, the PL is responsible for data transmission and receiving. At most eight transmission channels may be configured for the entire PL, and each of the transmission channels consists of four PHY DWORDs to form a hierarchical relationship. Each of the PHY DWORDs is responsible for transmitting the 32-bit data signal. Each of the transmission channels supports parallel transmission of 128-bit data, and is compatible with the DDR transmission mode and the SDR transmission mode.

In another embodiment, in addition to the full-speed eight channels, one, two, or four channels may be configured for the HLII to meet design requirements of different cases. All channels of the HLII are symmetrical and identical, and a PL of a HLII with multiple transmission channels can interconnect with a plurality of chiplets by simultaneously using multiple other HLIIs.

Figure 6:
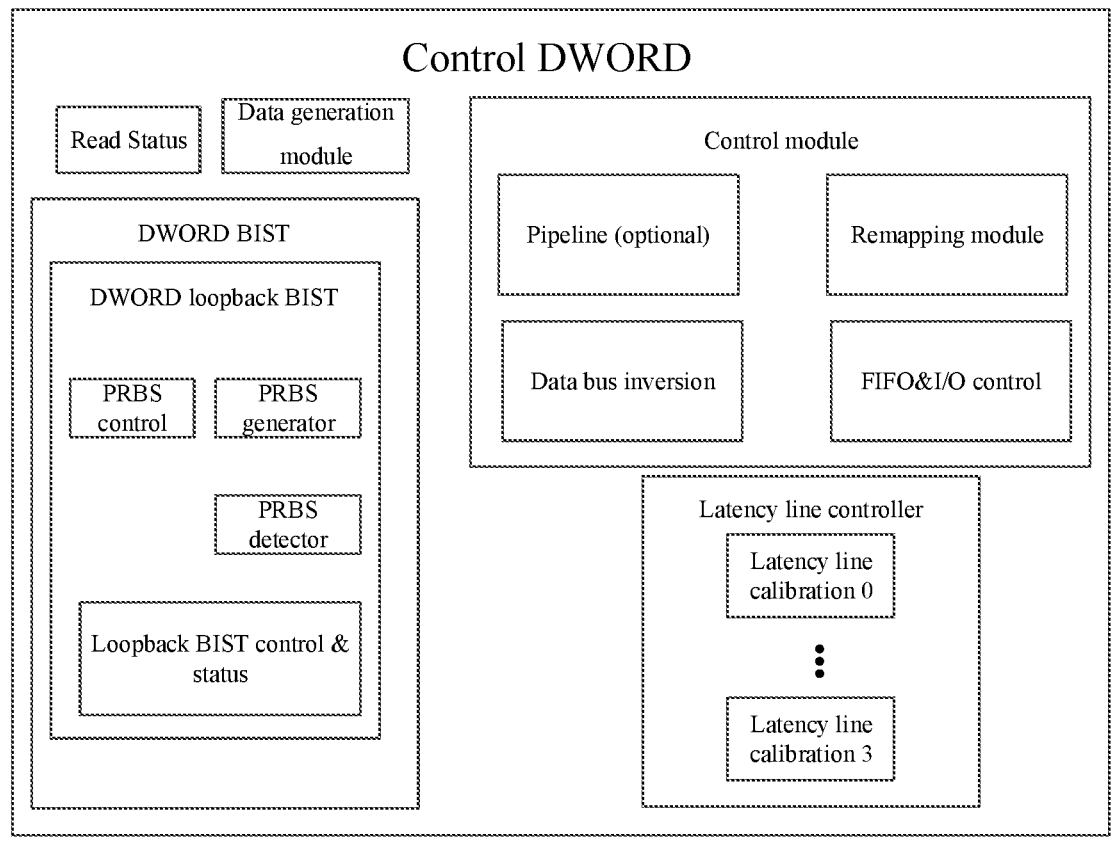
FIG. 6 is a block diagram of a top-level structure of a logical control subchannel according to an embodiment.

Referring to FIG. 6, the logical control subchannel (control DWORD) includes a control module, a latency line controller, a DWORD loopback BIST, a data generation module, and a read status. The control module is configured to control a data path and carry the data signal. The signal is located between the logical resource inside the chiplet and the silicon interposer, and passes through the HLII. The control module also includes a remapping module for interconnection redundancy and repair. The latency line controller is configured to perform control, calibration, and VT compensation for four DWORD latency lines (a WDQS_t/c latency line, a DQ latency line, an RDQS_t latency line, and an RDQS_c latency line). The DWORD loopback BIST is used to generate BIST logic in loopback testing and latency line testing. The data generation module is configured to generate training and testing data.

Figure 7:
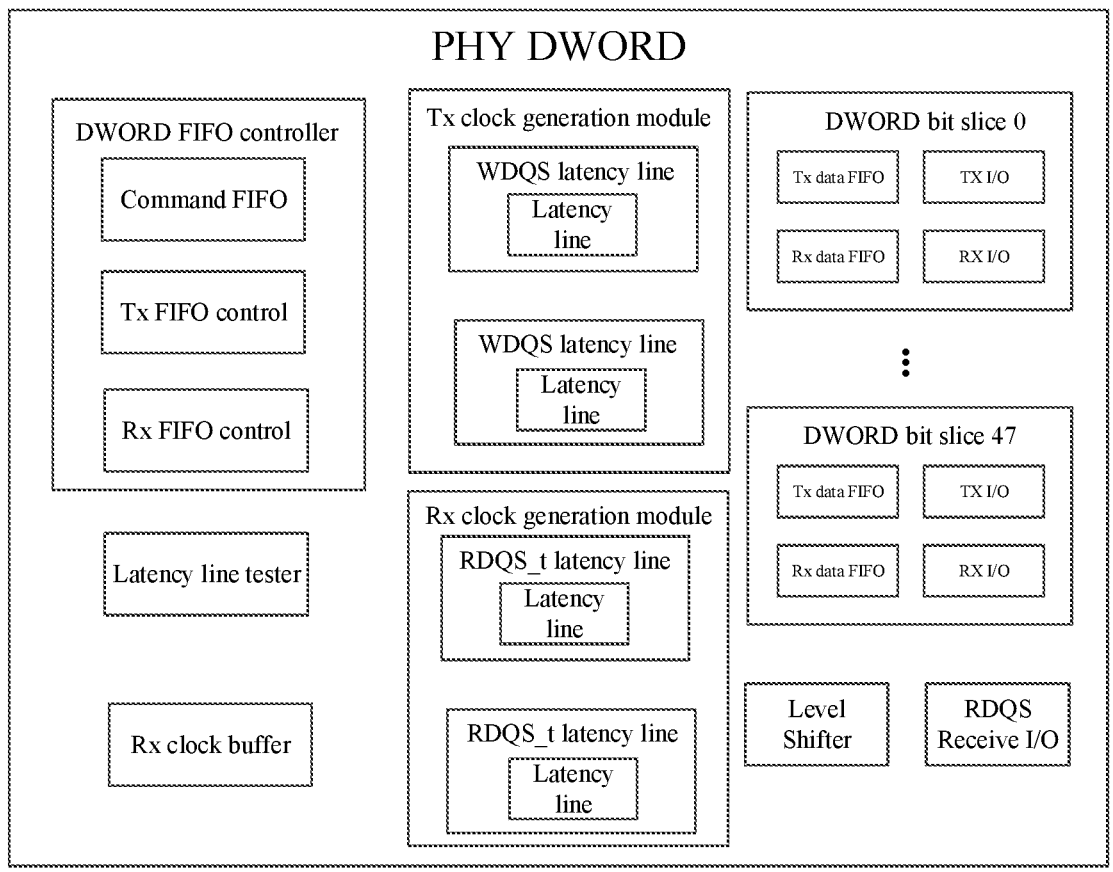
FIG. 7 is a block diagram of a top-level structure of a transmission subchannel according to an embodiment.

Referring to FIG. 7, the transmission subchannel (PHY DWORD) is mainly configured to complete data and signal transmission and receiving functions. In an embodiment, the PHY DWORD includes a plurality of DWORD bit slices, a Tx clock generation module, an Rx clock generation module, a DWORD FIFO controller, a latency line tester, and an Rx clock buffer. Each PHY DWORD can process a 48-bit data signal, in other words, includes 48 DWORD bit slices. Each of the DWORD bit slices consists of one Tx data FIFO, one Rx data FIFO, one Tx I/O, and one Rx I/O. The Tx clock generation module is configured to generate a high-speed clock for all other DWORD bit slices than four DWORD bit slices used for WDQS_t, WDQS_c, RDQS_t, and RDQS_c signals. The path, in the Tx clock generation module, which is configured to generate the high-speed clock consists of one latency line and some glue logic. The Rx clock generation module is configured to generate a high-speed clock for the four DWORD bit slices used for the WDQS_t, WDQS_c, RDQS_t, and RDQS_c signals. The path, in the Rx clock generation module, which is configured to generate the high-speed clock consists of one latency line and some glue logic. The DWORD bit slices used for the RDQS_t and RDQS_c signals are only used for loopback. The Rx clock generation module is configured to generate a read clock for capturing read data. The path, in the Rx clock generation module, which is configured to generate the read clock consists of two latency lines (used for the RDQS_t and RDQS_c signals respectively) and some glue logic. The Tx data FIFO is configured to send command and data signals, as well as to synchronously send data and command signals from an internal clock domain of the HLII to an I/O clock domain. The Rx data FIFO is configured to receive the data signal, as well as to synchronously receive data from an RDQS domain to the internal clock domain of the HLII. The latency line is configured to fine tune a latency on a Tx clock to concentrate the clock on a data eye, and is also a basis for implementing training by the HLII. For the latency line, the PHY DWORD is also designed with a latency line tester to test a ring oscillator of the latency line. The DWORD FIFO controller is configured to control the Tx data FIFO and the Rx data FIFO in the DWORD bit slice. The Rx clock buffer is configured to add a clock driver.

Figure 8:
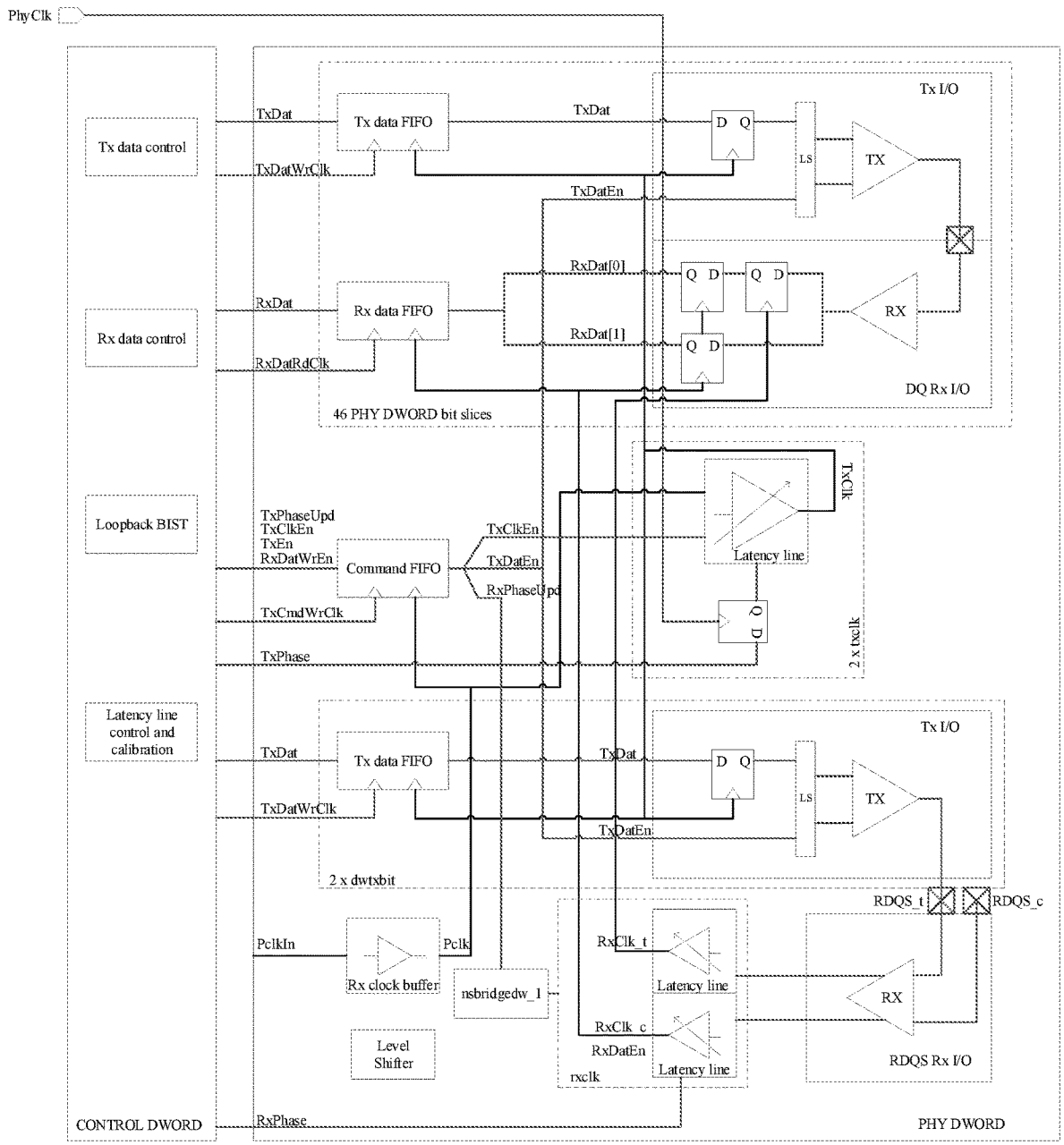
FIG. 8 shows a detailed logical structure of a transmission subchannel according to an embodiment.

In the HLII, die-to-die high-speed data signal transmission of the chiplet is based on the PHY DWORD in the PL. One PHY DWORD includes four-byte logic, and each byte has a dedicated data mask (DM) and a dedicated data bus inversion (DBI) signal, but all four bytes share a same data strobe pair. FIG. 8 shows a detailed logical structure of the PHY DWORD and a block diagram of a corresponding control DWORD at the LL.

The PHY DWORD includes transmission and loopback paths for the above 48-bit data signal. In detail, these signals include:

a data writing strobe pair (WDQS_t and WDQS_c);
a data reading strobe pair (RDQS_t and RDQS_c);
a data I/O signal (DQ[31:0]);
a DBI signal (DBI[3:0]);
a DM (DM[3:0]);
a data parity check signal (PAR);
a data parity check error (DERR); and
redundant data (RD[1:0]).

Although a data strobe is unidirectional strobe on writing or reading during normal read and write operations, in a loopback testing mode, a receiver and a driver are still respectively implemented for a writing strobe and a reading strobe.

Figure 9:
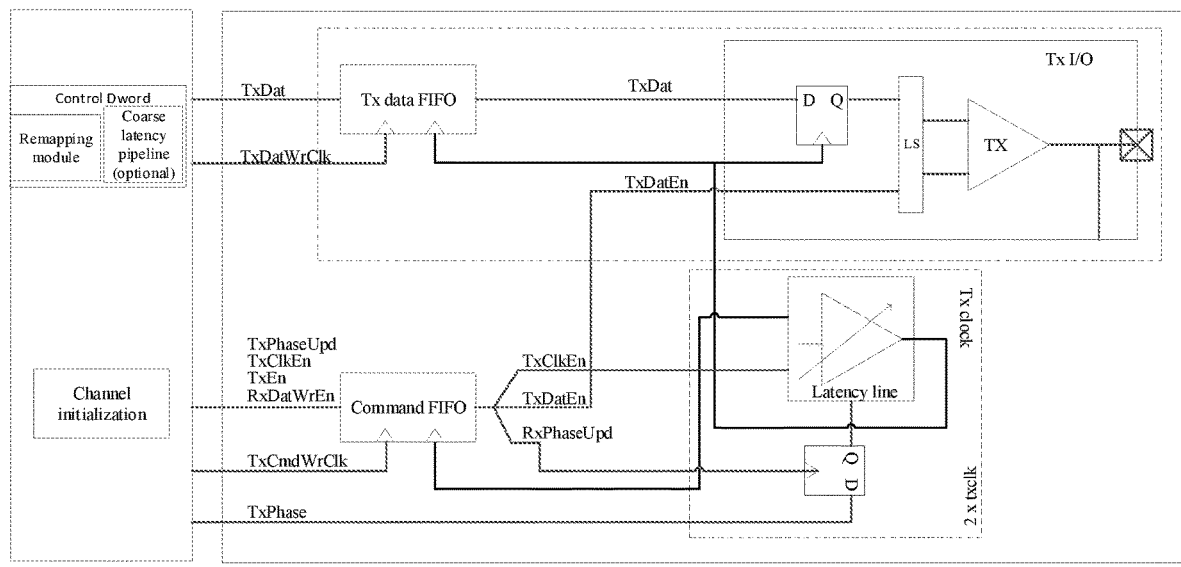
FIG. 9 shows a transmit path of write data from an LL to an output (side) of a PL according to an embodiment.

The PHY DWORD uses data writing interfaces (wrdata and wrdata_en) for data signal interaction with the LL inside the HLII. The LL uses a wrdata_en signal to execute a writing transaction. Each PHY DWORD has its own independent wrdata_en signal, such that the HLII can operate in a pseudo channel mode or a legacy mode. FIG. 9 shows details of a transmit path of write data from the LL to a output (side) of the PL.

A timing sequence and control information for sending a data writing signal are written from the LL into a command FIFO. The information includes signals for Tx enabling (TxEn), enabling of a read clock (TxClkEn) of the data FIFO, and updating of a latency value (TxPhaseUpd) of a latency line on the read clock of the Tx data FIFO. TxEn and TxClkEn are wrdata_en signals from the LL, and are enabled only when valid write data is sent by the controller (in other words, when the wrdata_en signal is valid).

Write data from the LL passes through a remapping module inside the LL before entering the PL, to take a result output by the remapping module as a result of interconnection redundancy and repair when some data paths in the HLII need to be remapped. Each write data also passes through an optional coarse latency pipeline that is configured to delay the signal at the LL.

Data to be sent on the data (DQ) signal is sent through the Tx data FIFO in the PHY DWORD. The Tx data FIFO is written only when the valid write data is sent by the controller (in other words, when the wrdata_en signal is valid). The Rx data FIFO is read by using a clock delayed by the latency line, and an output of the Tx data FIFO passes through a transmission circuit controlled by a clock.

For both the Tx data FIFO and the Rx data FIFO, a rate ratio of a write clock to the read clock is 1:2. Therefore, each input of the Tx data FIFO and Rx data FIFO has a 2-bit bit width, and an output of the FIFO has a 1-bit bit width. Therefore, for the Tx data FIFO and the Rx data FIFO, a ratio of a read depth to a write depth of the FIFO is also 2:1. If a write depth of the FIFO is 6, a read depth of the FIFO is 12.

An output enabling signal of the transmission circuit (TxDatEn) does not pass through the Tx data FIFO but passes through the command FIFO. Therefore, the output enabling signal of the transmission circuit is the same for all data channels inside a PHY DWORD. In addition, in order to reduce circuit area, an output inside the transmission circuit is not controlled by the clock. Due to a less stringent requirement for a timing sequence around a coordinator, a timing sequence of sending the output enabling signal is relatively loose. In order to provide any channel with a more flexible timing sequence requirement met by a same TxEn signal relative to TxDat, the CSRs inside the LL can be used to adjust a timing sequence of the TxEn signal, thereby providing a more timing sequence slack for a setup time and/or a hold time of relative Tx data (TxDat).

Figure 10:
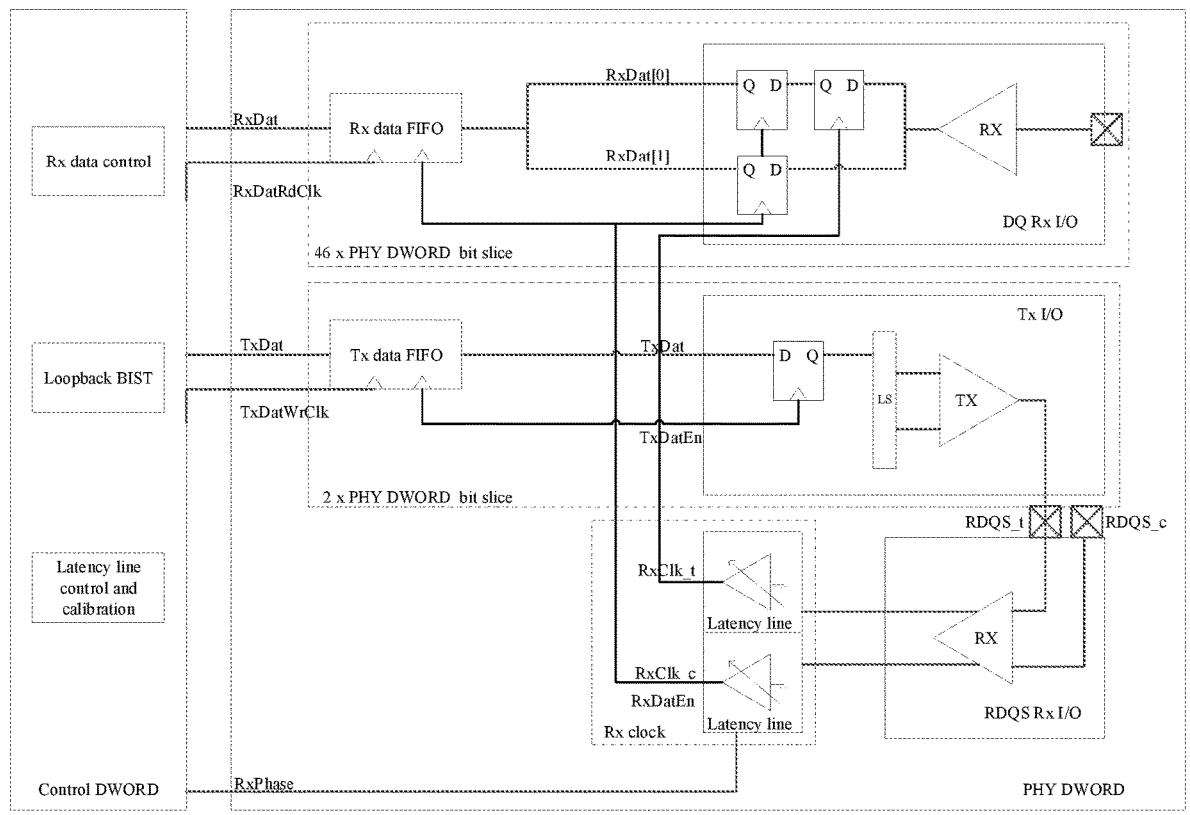
FIG. 10 shows a receive path of read data from an input (side) of a PL to an LL according to an embodiment.

The PHY DWORD uses data reading interfaces (rddata, rddata_en, and rddata_valid) for data interaction with the LL. The LL enables a data reading enabling signal (rddata_en) to execute a reading transaction. Each PHY DWORD has its own independent data reading enabling signal (rddata_en), such that the PL can operate in the pseudo channel mode or the legacy mode. The data is returned to the LL by using a data reading signal (rddata), and data receiving is confirmed by using a signal indicating valid read data (rddata_valid). FIG. 10 shows details about a receive path of read data from an input (side) of the PL to the LL.

A timing sequence and control information for sending the data reading signal are written from the LL into the command FIFO. The information includes a signal of updating a latency line on a reading clock of the Rx data FIFO (RxPhaseUpd). The RxPhaseUpd signal and other general FIFO control signal (such as pointer initialization signal) are generated by a channel initialization module during initialization or VT update.

Read data (DQ) from a die of an external chiplet is sampled by a DQ Rx I/O port and written into the Rx data FIFO through a data reading strobe signal (RDQS_t/RDQS_c). The data reading strobe signal is delayed by using the latency line to allow the data reading strobe signal to be aligned with a center of the read data eye. The die of the external chiplet drives the RDQS_t and the RDQS_c, such that a low value and a high value are valid at the same time. Therefore, time at which the unique data reading strobe signal needs to be masked is set to a pre-initialization state before a memory is reset to be invalid. Therefore, by default, the data reading strobe signal is enabled only after the reset signal is set to invalid. The behavior of masking the data reading strobe signal can be changed by using the CSRs inside the HLII.

The LL uses a data reading enabling signal to enable reading of the Rx data FIFO. Data from the Rx data FIFO passes through the remapping module at the LL to take a result output by the remapping module as a result of interconnection redundancy and repair in the HLII when some data paths need to be remapped. After calibration, the data reading enabling signal generates a signal indicating valid read data, to discard invalid data locked in FIFOs on a pre-amble or post-amble at a rising edge of the data reading strobe signal. A round-trip latency in data reading is usually compensated by a quantity of latency cycles that is obtained through training.

In the Rx data FIFO, a ratio of the write clock to the read clock is 1:1, and the write clock has a DDR. Therefore, an input of each Rx data FIFO has a 2-bit bit width, and an output of each FIFO has a 2-bit bit width.

According to a second aspect, the embodiments of the present disclosure further provide a high-speed low-latency interconnection topology for silicon interposer interconnection, including a plurality of chiplets stacked on a silicon interposer and at least one interconnection interface corresponding to each of the chiplets. The interconnection interface is the HLII described in the first aspect of the embodiments of the present disclosure.

In an embodiment, the HLII has one, two, four, eight, or more transmission channels, and transmission channels of a plurality of Hills are symmetrical and identical to support interconnection between the plurality of Hills.

Figure 11:
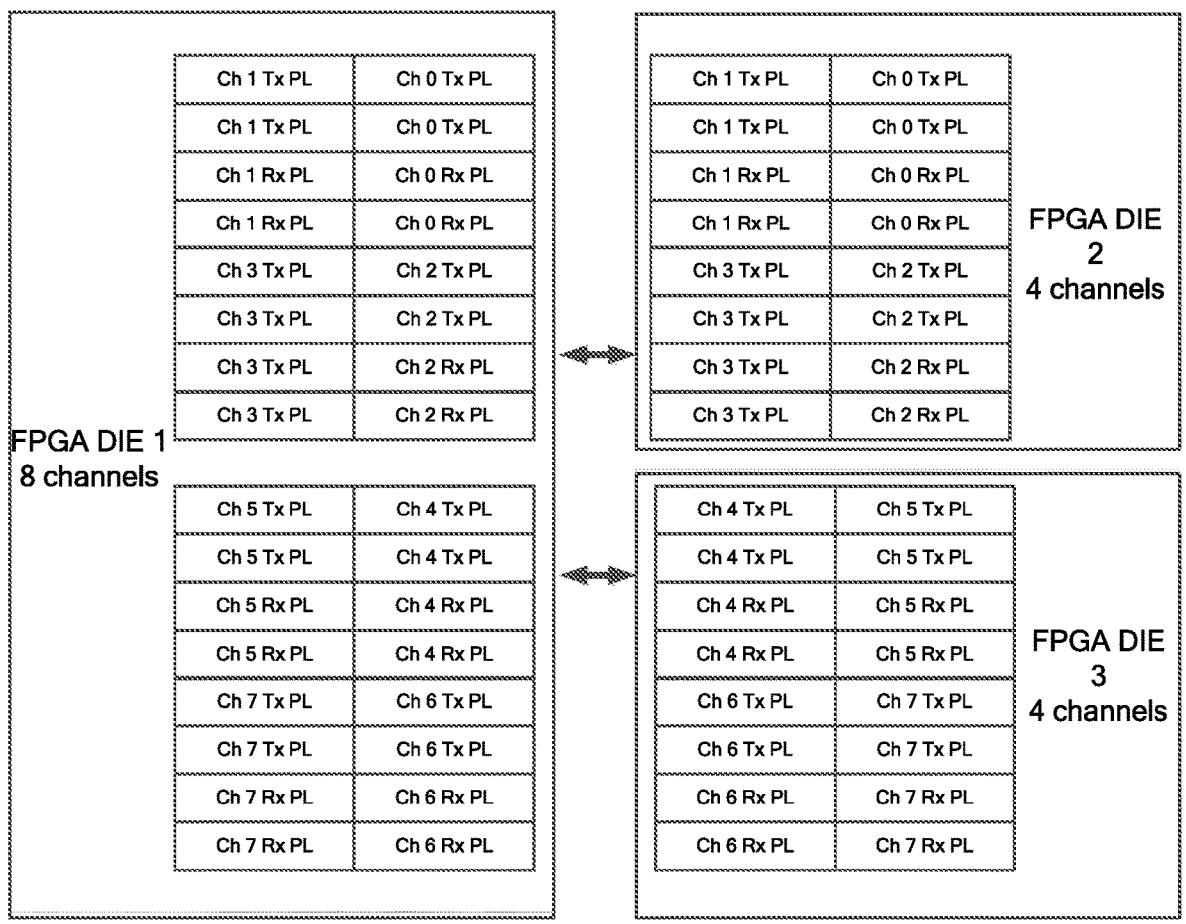
FIG. 11 schematically shows interconnection between chiplets with HLIIs of different channel quantities according to an embodiment.

FIG. 11 shows interconnection between chiplets with Hills of different channel quantities. From the figure, it can be seen that an HLII of chiplet 1 includes eight channels, while Hills of chiplet 2 and chiplet 3 each include four channels. In FIG. 11, the chiplet 1, the chiplet 2, and the chiplet 3 are all FPGA dies. Because the Hills are symmetrical and identical, a single HLII with multiple transmission channels can be connected to a plurality of HLIIs. FIG. 11 shows an interconnection mode between an FPGA die having the HLII with 8 channels and two FPGA dies having the HLII with 4 channels.

The HLII for silicon interposer interconnection in the embodiments of the present disclosure is configured to perform large-scale I/O interconnection on a silicon interposer, and the HLII includes a PL and an LL. The LL is located between the PL and logical resource inside a chiplet. The LL is configured to receive a signal of the logical resource inside the chiplet, and can complete a control function for the PL. The PL receives and transmits a signal transmitted through the LL, such as a data signal converted by the LL, for example, transmits the data signal to a PL of another HLII through a silicon interposer; and receives a data signal transmitted by the PL of the another HLII, transmits the data signal to the LL of the same one HLII, such that the LL receives the signal and then transmits the signal to the logical resource inside the chiplet, to transmit a data flow between the Hills for silicon interposer interconnection. This can provide the chiplet with protocol-free high-speed data transmission on the silicon interposer, achieving efficient data transmission, a high-performance power consumption ratio, and other requirements.

Further, the HLII for silicon interposer interconnection can support a plurality of transmission channels. Each of the transmission channels supports parallel data transmission, and is compatible with a DDR transmission mode and an SDR transmission mode. Each of the transmission channels includes a plurality of transmission subchannels, and each of the transmission subchannels can provide at least 32-bit data transmission. The working mode of one, two, four, eight, or more transmission channels may be configured for the HLII in the present disclosure to meet design requirements of different cases. All channels of the HLII are symmetrical and identical, and a PL of a HLII with multiple transmission channels can support interconnection with a plurality of chiplets by using multiple other Hills.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

The above embodiments are merely illustrative of several implementations of the present disclosure, and the description thereof is more specific and detailed, but is not to be construed as a limitation to the patentable scope of the present disclosure. It should be noted that those of ordinary skill in the art can further make variations and improvements without departing from the conception of the present disclosure. These variations and improvements all fall within the protection scope of the present disclosure. Therefore, the protection scope of the present disclosure should be subject to the protection scope defined by the claims.

What is claimed is:

1. A high-speed low-latency interconnect interface (HLII) for a silicon interposer interconnection, comprising a physical layer (PL) and a link layer (LL) between a logical resource inside a chiplet and the PL, wherein
the LL is configured to receive a signal of the logical resource inside the chiplet, transmit the signal of the logical resource inside the chiplet to the PL, and the LL is further configured to control the PL based on the signal of the logical resource inside the chiplet, wherein the signal of the logical resource inside the chiplet comprises a data signal, and the operation of transmitting, by the LL, the signal of the logical resource inside the chiplet to the PL comprises performing data conversion on the data signal to obtain a converted data signal and sending the converted data signal to the PL; and
the PL is configured to receive the signal transmitted through the LL, and transmit the signal to a PL of another HLII through a silicon interposer; and the PL is further configured to receive a signal transmitted by the PL of the another HLII, and transmit the signal transmitted by the PL of the another HLII to the LL of the HLII, wherein the LL receives the signal and transmits the signal to the logical resource inside the chiplet;
wherein the PL comprises at least one transmission channel, and the LL comprises at least one logical control channel, wherein a quantity of transmission channels is the same as a quantity of logical control channels;
each of the transmission channels is configured to transmit the data signal, and modes of transmitting, by the transmission channels, the data signal comprise a double date rate (DDR) transmission mode and a single data rate (SDR) transmission mode;
each of the logical control channels is configured to control and schedule a data flow transmitted by corresponding one transmission channel;
each of the transmission channels comprises a plurality of transmission subchannels, and each of the plurality of transmission subchannels is responsible for transmitting at least a 32-bit data signal; and
each of the logical control channels comprises a plurality of logical control subchannels, the plurality of logical control subchannels are in one-to-one correspondence with the plurality of transmission subchannels, and each of the plurality of logical control subchannels is configured to control and schedule a data flow transmitted by corresponding one transmission subchannel.

2. The HLII according to claim 1, wherein the signal of the logical resource inside the chiplet further comprises a configuration signal and a control signal, and the operation of controlling, by the LL, the PL comprises performing data conversion, parity check, training, channel repair, and instruction stream generation for the PL.

3. The HLII according to claim 1, wherein each of the plurality of transmission subchannels comprises a plurality of data word (DWORD) bit slices, a transmit (Tx) clock generation module, a receive (Rx) clock generation module, a DWORD first input first output (FIFO) controller, a latency line tester, and an Rx clock buffer;
each of the plurality of DWORD bit slices comprises a Tx data FIFO, an Rx data FIFO, a Tx input/output (I/O), and an Rx I/O;
the Tx clock generation module is configured to generate a high-speed clock;
the Rx clock generation module is configured to generate a high-speed clock and a read clock for capturing read data;

the DWORD FIFO controller is configured to control the Tx data FIFO and the Rx data FIFO in each of the plurality of DWORD bit slices;

the latency line tester is configured to test a ring oscillator of a latency line, and the latency line is configured to fine tune a latency of a Tx clock to concentrate the clock on a data eye; and the Rx clock buffer is configured to add a clock driver.

4. The HLII according to claim 1, wherein each of the plurality of logical control subchannels comprises a control module, a latency line controller, a DWORD loopback built-in self-test (BIST), a data generation module, and a data check module;

the control module is configured to control a data path and carry the data signal;

the latency line controller is configured to perform control, calibration, and virtualization technology (VT) compensation on a DWORD latency line;

the DWORD loopback BIST is configured to generate a BIST logic in loopback testing and latency line testing; and the data generation module and the data check module are configured to generate training and testing data.

5. The HLII according to claim 1, wherein the PL further comprises a PL master and an interface testing module;

the PL master is configured to provide a global clock, a reset signal, and a reference voltage for the PL; and the interface testing module is configured to conduct a functional test on the HLII.

6. A high-speed low-latency interconnect interface (HLII) for a silicon interposer interconnection, comprising a physical layer (PL) and a link layer (LL) between a logical resource inside a chiplet and the PL, wherein the LL is configured to receive a signal of the logical resource inside the chiplet, transmit the signal of the logical resource inside the chiplet to the PL, and the LL is further configured to control the PL based on the signal of the logical resource inside the chiplet, wherein the signal of the logical resource inside the chiplet comprises a data signal, and the operation of transmitting, by the LL, the signal of the logical resource inside the chiplet to the PL comprises performing data conversion on the data signal to obtain a converted data signal and sending the converted data signal to the PL; and the PL is configured to receive the signal transmitted through the LL, and transmit the signal to a PL of another HLII through a silicon interposer; and the PL is further configured to receive a signal transmitted by the PL of the another HLII, and transmit the signal transmitted by the PL of the another HLII to the LL of the HLII, wherein the LL receives the signal and transmits the signal to the logical resource inside the chiplet;

wherein the PL comprises at least one transmission channel, and the LL comprises at least one logical control channel, wherein a quantity of transmission channels is the same as a quantity of logical control channels;

each of the transmission channels is configured to transmit the data signal, and modes of transmitting, by the transmission channels, the data signal comprise a double date rate (DDR) transmission mode and a single data rate (SDR) transmission mode;

each of the logical control channels is configured to control and schedule a data flow transmitted by corresponding one transmission channel;

the LL further comprises an LL master, and the LL master comprises a configuration module, master control and status registers (CSRs), an initialization engine, a training controller, a resetting and testing controller, a P1500 controller, an instruction stream generator, and an instruction unit;

the configuration module is configured to interact with transactions of an advanced peripheral bus (APB) interface, a test data register (TDR) interface, and a joint test action group (JTAG) interface for reading and writing CSRs;

the master CSRs comprise CSRs allowed to be shared by the HLII;

the initialization engine is configured to implement an initialization process in terms of hardware and cooperate with the CSRs to initialize the HLII;

the training controller is configured to automatically train a read latency, a read data eye, a write data eye, and a reference voltage;

the resetting and testing controller is configured to generate a reset signal, control and calibrate an impedance of an I/O driver, provide a global reference voltage for an I/O receiver, provide a testing output I/O port configured to monitor an internal testing signal of the HLII, and provide an I/O port of an interface testing module;

the P1500 controller is configured to generate a P1500 instruction for testing;

the instruction stream generator is an engine for executing an internal instruction of the HLII and the P1500 instruction; and the instruction unit is configured to decode and distribute the internal instruction of the HLII.

7. A high-speed low-latency interconnection topology for a silicon interposer interconnection, comprising a plurality of chiplets stacked on a silicon interposer and at least one interconnection interface corresponding to each of the plurality of chiplets, wherein the at least one interconnection interface is the HLII according to claim 1.

8. The high-speed low-latency interconnection topology according to claim 7, wherein each of interconnection interfaces comprises at least one transmission channel, and transmission channels of the interconnection interfaces are symmetrical and identical to support interconnection between the interconnection interfaces.

9. The high-speed low-latency interconnection topology according to claim 7, wherein in the HLII, the signal of the logical resource inside the chiplet further comprises a configuration signal and a control signal, and the operation of controlling, by the LL, the PL comprises performing data conversion, parity check, training, channel repair, and instruction stream generation for the PL.

10. The high-speed low-latency interconnection topology according to claim 7, wherein in the HLII, each of the plurality of transmission subchannels comprises a plurality of data word (DWORD) bit slices, a transmit (Tx) clock generation module, a receive (Rx) clock generation module, a DWORD first input first output (FIFO) controller, a latency line tester, and an Rx clock buffer;

each of the plurality of DWORD bit slices comprises a Tx data FIFO, an Rx data FIFO, a Tx input/output (I/O), and an Rx I/O;

the Tx clock generation module is configured to generate a high-speed clock;

the Rx clock generation module is configured to generate a high-speed clock and a read clock for capturing read data;

the DWORD FIFO controller is configured to control the Tx data FIFO and the Rx data FIFO in each of the plurality of DWORD bit slices;

the latency line tester is configured to test a ring oscillator of a latency line, and the latency line is configured to fine tune a latency of a Tx clock to concentrate the clock on a data eye; and the Rx clock buffer is configured to add a clock driver.

11. The high-speed low-latency interconnection topology according to claim 7, wherein in the HLII, each of the plurality of logical control subchannels comprises a control module, a latency line controller, a DWORD loopback built-in self-test (BIST), a data generation module, and a data check module;

the control module is configured to control a data path and carry the data signal;

the latency line controller is configured to perform control, calibration, and virtualization technology (VT) compensation on a DWORD latency line;

the DWORD loopback BIST is configured to generate a BIST logic in loopback testing and latency line testing; and the data generation module and the data check module are configured to generate training and testing data.

12. The high-speed low-latency interconnection topology according to claim 7, wherein in the HLII, the PL further comprises a PL master and an interface testing module;

the PL master is configured to provide a global clock, a reset signal, and a reference voltage for the PL; and the interface testing module is configured to conduct a functional test on the HLII.

13. A high-speed low-latency interconnection topology for a silicon interposer interconnection, comprising a plurality of chiplets stacked on a silicon interposer and at least one interconnection interface corresponding to each of the plurality of chiplets, wherein the at least one interconnection interface is the HLII according to claim 8.

* * * * *